Patented Dec. 13, 1938

2,139,661

UNITED STATES PATENT OFFICE 2,139,661

PROCESS OF STABILIZING CELLULOSE ACETOBUTYRATES

Rudolph S. Bley, Milligan College, Tenn., assignor to North American Rayon Corporation, New York, N. Y., a corporation of Delaware No Drawing. Application May 3, 1938, Serial No. 205,716

9 Claims. (Cl. 260—230)

The present invention relates to a process of stabilizing cellulose acetobutyrates.

The primary object of this invention is to provide for a process of stabilizing a cellulose acetobutyrate with the assistance of anhydrous, liquid ammonia.

Another object of this invention is to provide for a process of stabilizing and at the same time purifying a crude cellulose acetobutyrate by means of anhydrous, liquid ammonia.

Other objects of this invention will become apparent to those skilled in the art from a study of the following specification.

Cellulose acetobutyrate is conventionally produced by esterifying cellulose with butyric acid and acetic anhydride in the presence of an acid catalyst, such as, for example, sulphuric acid, an organic sulphonic acid, etc. However, although these reactions run smoothly in the presence of such acid catalysts the cellulose acetobutyrates contain impurities, such as lower substituted esters, side reaction products, residual acids and catalysts, etc., which cause discolorations of artificial products formed therefrom.

Innumerable attempts have been made to stabilize cellulose esters, such as fibrous cellulose triacetate, by removing the acid catalysts contained therein. U. S. Patent #1,954,729 to Dreyfus of April 10, 1934, discloses the stabilization of cellulose derivatives by treating them with an aliphatic alcoholic amine in the presence of sodium hypochlorite, etc. U. S. Patent #2,091,921 to Malm et al. of November 5, 1935, relates to a process of stabilizing cellulose triacetate by treating it with a petroleum distillate having a boiling range of about 150–200° C. Sindl (vide U. S. Patent #2,066,584 of January 5, 1937) stabilizes cellulose triacetate containing sulphuric acid residues in a swelled state with a mixture of a lower fatty acid and a liquid ester of a lower fatty acid. U. S. Patent #2,071,333 to Dreyfus of February 23, 1937, removes the acid catalysts by treating crude cellulose triacetate with steam. Alkali fluorides and borates are used for the same purpose by Ellis et al., as disclosed in their U. S. Patent #2,072,253 of March 2, 1937. U. S. Patent #2,072,260 to Haney of March 2, 1937, discloses the elimination of acid catalysts from crude cellulose triacetate by means of water-insoluble salts of basic character. Martin (vide U. S. Patent #2,072,270 of March 2, 1937) neutralizes the acid residues with sodium acetate, etc. U. S. Patent #2,095,334 to Jones of October 12, 1937, relates to a process of stabilizing cellulose triacetate by passing through it a hot 0.01–0.03% sulphuric acid solution. Malm and Fordyce (vide U. S. Patent #2,095,822 of October 12, 1937) remove the acid catalyst from cellulose triacetate with butyric acid, etc.

Furthermore, I am well aware that cellulose has been rendered more reactive by treating it with liquid ammonia (vide U. S. Patent #1,173,336 to Bronner of February 29, 1916), and that U. S. Patents #1,966,756 to Gajewski and #2,012,382 to Fink, disclose the dissolution of fibroin in anhydrous, liquid ammonia. I am also aware that cellulose diacetate has been dissolved in liquid, anhydrous ammonia to form solutions from which artificial products may be spun, as set forth in U. S. Patent #1,544,809 and British Patent #182,488 to Clancy, that unsaturated cellulose esters have been treated with anhydrous, liquid ammonia to introduce amino groups into these esters, and that nitrogenous cellulose derivatives have been prepared by causing ammonia in anhydrous alcohol to react with cellulose esters having unsaturated radicals in accordance with a process disclosed in U. S. Patent #2,073,052 to Dreyfus of March 9, 1937.

By experimentation, I have unexpectedly found that crude cellulose acetobutyrates can be stabilized by treating these esters with anhydrous, liquid ammonia. During this treatment lower substituted esters are separated from the acetobutyrates and the acid catalysts, contained therein, are removed with the formation of inoccuous ammonium salts which are either soluble or insoluble in anhydrous, liquid ammonia. Insoluble ammonium salts may be removed by washing from the purified, stabilized cellulose acetobutyrates. Esters formed by chemical interaction between acid halides or anhydrides and the acid catalysts are generally ammonolyzed in liquid, anhydrous ammonia. Although I prefer to use anhydrous, liquid ammonia at its boiling point under normal atmospheric pressures, i. e. at a temperature of about —33° C., the process may be carried out at higher or lower temperatures. The aforementioned temperature may be lowered by evacuating the reaction vessel or raised by carrying out the stabilization in a pressure chamber. In this manner, a complete stabilization and purification of the cellulose acetobutyrates may be achieved.

The stabilization of a crude cellulose acetobutyrate, as set forth above, may also be carried out in the presence of an auxiliary agent or a plurality of auxiliary agents. Auxiliary agents, in accordance with the present invention, are such compounds which are miscible with or capable of being dissolved in anhydrous, liquid ammonia without chemical decomposition by chemical interaction, i. e., compounds which are inert to anhydrous, liquid ammonia. In addition, these auxiliary agents must be such compounds as are incapable of decomposing cellulose acetobutyrates. They may, furthermore be compounds capable of dissolving incompletely saturated cellulose esters. These auxiliary agents may be organic or inorganic compounds, such as benzene, ethers, esters, alcohols, metal nitrates, ammonium salts, etc.

*Example I*

About 100 parts of a purified cellulose, such as cotton, wood pulp, etc., are pretreated with 40–50% sulphuric acid for about 12 hours. The washed and dried product is then wetted with about 25 parts of glacial acetic acid for about 14 hours at room temperature. A mixture of about 250 parts of acetic anhydride, about 500 parts of butyric acid and 5 parts of sulphuric acid is then added to the pretreated cellulose. The mass begins to gel after a short period of time with a rise in temperature to about 40° C. The mass is stirred for about 30–60 minutes and then brought up to a temperature of about 50° C. to complete dissolution of the cellulose. The cellulose acetobutyrate is subsequently precipitated in fibrous or flaky form by the addition of water or any non-solvent of the ester. Finally, the cellulose acetobutyrate is separated from excess liquid, washed and dried. In order to stabilize this crude cellulose acetobutyrate, i. e. to remove therefrom catalyst residues and other impurities, it is introduced into anhydrous, liquid ammonia. The ammonia neutralizes the catalyst with the formation of an ammonium salt and dissolves organic impurities, such as for example lower substituted cellulose esters, etc. Although the stabilization is preferably carried out at the boiling point of anhydrous, liquid ammonia, i. e., at a temperature of about −33° C., higher or lower temperatures may be chosen for this purpose. In other words, the ammonia may have any temperature at which the cellulose acetobutyrate is not chemically attacked. Although stabilization of the ester is generally completed within a few hours of time, the duration of the treatment of cellulose acetobutyrate may be prolonged without detrimental effect. Even after remaining for 15 hours in anhydrous, liquid ammonia there was no sign of ammonolysis. After separating the cellulose acetobutyrate from the liquid ammonia a very stable cellulose ester is obtained.

*Example II*

A cellulose acetobutyrate, sold under the trade name of "Hercose C", containing about 18 to 22% butyrate and 38–42% acetate, is introduced for about two hours into anhydrous, liquid ammonia contained in a Dewar flask to remove the residual catalyst therefrom. The stabilized cellulose acetobutyrate is subsequently separated from the ammonia containing dissolved impurities. The product is clearly soluble in acetonyl acetone. The stabilization of cellulose acetobutyrate, as set forth in Examples I and II may be carried out at higher or lower temperatures in the presence of auxiliary agents. The acetobutyrates may be prepared with any acid catalyst in any known manner, as disclosed for example in British Patent No. 321,575, etc.

Modifications of my invention will readily be recognized by those skilled in the art, and I desire to include all modifications coming within the scope of the following claims. In these claims the term "crude cellulose acetobutyrate" indicates a cellulose acetobutyrate containing an acid catalyst and/or organic impurities, such as lower substituted cellulose esters soluble in liquid, anhydrous ammonia.

I claim:

1. The process of stabilizing a cellulose acetobutyrate which comprises introducing a crude cellulose acetobutyrate into anhydrous, liquid ammonia and subsequently separating said cellulose acetobutyrate from said ammonia, said acetobutyrate being substantially insoluble in said ammonia.

2. The process of stabilizing a cellulose acetobutyrate which comprises introducing a crude cellulose acetobutyrate into anhydrous, liquid ammonia at a temperature of about −33° C. and subsequently separating said cellulose acetobutyrate from said ammonia, said acetobutyrate being substantially insoluble in said ammonia.

3. The process of stabilizing a cellulose acetobutyrate which comprises introducing a crude cellulose acetobutyrate into anhydrous, liquid ammonia at a temperature below −33° C. and subsequently separating said cellulose acetobutyrate from said ammonia, said acetobutyrate being substantially insoluble in said ammonia.

4. The process of stabilizing a cellulose acetobutyrate which comprises introducing a crude cellulose acetobutyrate into anhydrous, liquid ammonia in the presence of an auxiliary agent and subsequently separating said cellulose acetobutyrate from said ammonia, said acetobutyrate being substantially insoluble in said ammonia and said auxiliary agent being inert to said ammonia.

5. The process of stabilizing a cellulose acetobutyrate which comprises introducing a crude cellulose acetobutyrate into anhydrous, liquid ammonia at a temperature of about −33° C. in the presence of an auxiliary agent, said acetobutyrate being substantially insoluble in said ammonia and said auxiliary agent being inert to said ammonia.

6. The process of stabilizing a cellulose acetobutyrate which comprises introducing a crude cellulose acetobutyrate into anhydrous, liquid ammonia at a temperature below −33° C. in the presence of an auxiliary agent, said acetobutyrate being substantially insoluble in said ammonia and said auxiliary agent being inert to said ammonia.

7. A stabilized cellulose acetobutyrate prepared in accordance with the process set forth in claim 1.

8. A stabilized cellulose acetobutyrate prepared in accordance with the process set forth in claim 2.

9. A stabilized cellulose acetobutyrate prepared in accordance with the process set forth in claim 3.

RUDOLPH S. BLEY.